US009493246B2

United States Patent
Barmichev et al.

(10) Patent No.: US 9,493,246 B2
(45) Date of Patent: Nov. 15, 2016

(54) CRYOGENIC FUEL TANKS FOR USE IN AIRCRAFT STRUCTURES

(71) Applicant: The Boeing Company, Chicago, IL (US)

(72) Inventors: Sergey D. Barmichev, Kirkland, WA (US); Mithra M. K. V. Sankrithi, Lake Forest Park, WA (US); Victor K. Stuhr, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 182 days.

(21) Appl. No.: 14/025,437

(22) Filed: Sep. 12, 2013

(65) Prior Publication Data

US 2015/0069184 A1    Mar. 12, 2015

(51) Int. Cl.
| | |
|---|---|
| *B64D 37/02* | (2006.01) |
| *B64D 37/04* | (2006.01) |
| *B64D 37/12* | (2006.01) |
| *B64D 37/30* | (2006.01) |
| *B64C 3/34* | (2006.01) |

(52) U.S. Cl.
CPC ................. *B64D 37/04* (2013.01); *B64C 3/34* (2013.01); *B64D 37/30* (2013.01); *Y02T 90/44* (2013.01)

(58) Field of Classification Search
CPC ........... B64C 3/34; B64D 37/04; B64D 37/30; B64D 37/02; B64D 37/06; B64D 37/08
See application file for complete search history.

(56) References Cited

U.S. PATENT DOCUMENTS

| | | | | |
|---|---|---|---|---|
| 2,543,709 | A | * 2/1951 | Saulnier | ................. B64D 37/04 244/124 |
| 3,951,362 | A | * 4/1976 | Robinson | ............... B64D 37/06 114/74 A |
| 5,150,812 | A | 9/1992 | Adams | |
| 5,408,825 | A | 4/1995 | Foss et al. | |
| 5,660,358 | A | 8/1997 | Grafwallner et al. | |
| 6,422,514 | B1 | 7/2002 | Clark et al. | |
| 7,624,946 | B2 | 12/2009 | Schoene | |
| 7,871,042 | B2 | * 1/2011 | Velicki et al. | ............ 244/135 R |
| 8,523,105 | B2 | 9/2013 | Buchheit | |
| 2003/0230671 | A1 | 12/2003 | Dunn | |
| 2004/0129836 | A1 | 7/2004 | Seidel | |

(Continued)

FOREIGN PATENT DOCUMENTS

| | | |
|---|---|---|
| DE | 102009029245 | 3/2011 |
| WO | WO2011026965 | 3/2011 |

(Continued)

OTHER PUBLICATIONS

Alle Rechte bei, Bauhaus-Luftfahrt—Symposium "Future of Aviation—Perspectives for 2050," Munich, Jun. 4, 2013, 38 pages.

(Continued)

*Primary Examiner* — Philip J Bonzell

(74) *Attorney, Agent, or Firm* — Hanley, Flight and Zimmerman, LLC.

(57) ABSTRACT

Cryogenic fuels tanks for use in aircraft structures are disclosed herein. An example apparatus disclosed herein an airfoil-shaped structure disposed outboard of a fuselage of an aircraft. The example apparatus also includes a first cryogenic fuel tank disposed inside the airfoil-shaped structure.

22 Claims, 14 Drawing Sheets

(56) References Cited

U.S. PATENT DOCUMENTS

| | | | |
|---|---|---|---|
| 2004/0217231 | A1 | 11/2004 | D'Auvergne |
| 2004/0245382 | A1* | 12/2004 | Nozaki .................... 244/53 R |
| 2005/0178911 | A1 | 8/2005 | Armand |
| 2005/0230554 | A1 | 10/2005 | Schoene |
| 2008/0006743 | A1 | 1/2008 | Miller et al. |
| 2008/0230654 | A1* | 9/2008 | Velicki et al. ............ 244/135 R |
| 2011/0101166 | A1 | 5/2011 | Schwarze et al. |
| 2012/0193479 | A1 | 8/2012 | Roscoe et al. |
| 2013/0192246 | A1 | 8/2013 | Kamath et al. |
| 2014/0026597 | A1 | 1/2014 | Epstein et al. |
| 2014/0339367 | A1 | 11/2014 | Sankrithi et al. |
| 2015/0064585 | A1 | 3/2015 | Hyde et al. |
| 2015/0069184 | A1 | 3/2015 | Barmichev et al. |

FOREIGN PATENT DOCUMENTS

| | | |
|---|---|---|
| WO | WO2012045029 | 4/2012 |
| WO | WO2012045035 | 4/2012 |

OTHER PUBLICATIONS

European Patent Office, "Extended European Search Report," issued in connection with European patent application No. 14184139.5, on Feb. 9, 2015, 7 pages.

Bradley et al., "Subsonic Ultra Green Aircraft Research Phase II: N+4 Advanced Concept Development", Boeing Research and Technology, Huntington Beach, California, NASA/CR-2012-217556, Hampton, Virgina, May 2012, 148 pages.

Patent Cooperation Treaty, "International Search Report and Written Opinion", issued in connection with international application No. PCT/US2014/032318, mailed on Dec. 15, 2014, 5 pages.

Yefim Gordon, Bill Gunston: "Soviet X-Planes", Midland Publishing, Leicester, England, Jan. 1, 2000, XP055102363, ISBN: 1857800990 pp. 201-202.

United States Patent and Trademark Office, "Non-Final Office Action", issued in connection with U.S. Appl. No. 13/897,452 on Apr. 8, 2015, 28 pages.

United States Patent and Trademark Office, "Final Office Action", issued in connection with U.S. Appl. No. 13/897,452 on Aug. 25, 2015, 45 pages.

Prentex Alloy Fabricators, Inc., http://www.prentex.com/insulated.php (last accessed Sep. 22, 2015), 1 page.

United States Patent and Trademark Office, "Advisory Action", issued in connection with U.S. Appl. No. 13/897,452 on Nov. 12, 2015, 2 pages.

Patent Cooperation Treaty, "International Preliminary Report on Patentability", issued in connection with nternational application No. PCT/US2014/032318, mailed on Nov. 24, 2015, 7 pages.

United States Patent and Trademark Office, "Office Action", issued in connection with U.S. Appl. No. 13/897,452 on Feb. 24, 2016, 20 pages.

United States Patent and Trademark Office, "Final Office Action", issued in connection with U.S. Appl. No. 13/897,452 on Aug. 8, 2016, 18 pages.

* cited by examiner

CRYOGENIC FUEL TANKS FOR USE IN AIRCRAFT STRUCTURES

FIELD

The present disclosure relates generally to aircraft fuel systems and, more particularly, to cryogenic fuel tanks for use in aircraft structures.

BACKGROUND

Generally, cryogenic fuels (e.g., liquid methane, liquid hydrogen, etc.) have lower volumetric energy densities than conventional jet fuels (e.g., kerosene based jet fuels). As a result, aircrafts employing cryogenic fuels often include exterior fuel tanks and/or large interior fuel tanks. To accommodate the large interior fuel tanks, the aircrafts generally employ fuselages having crowns, lumps, bulges and/or oversized dimensions. These fuselages and/or the exterior tanks increase an amount of drag on the aircrafts.

SUMMARY

An example apparatus disclosed herein includes an airfoil-shaped structure disposed outboard of a fuselage of an aircraft. The example apparatus also includes a first cryogenic fuel tank disposed inside the airfoil-shaped structure.

Another example apparatus includes a housing of an aircraft. The housing is disposed outboard of a fuselage of the aircraft. The example apparatus also includes a first cryogenic fuel tank disposed inside the housing and extending spanwise relative to the aircraft.

Another example apparatus includes a housing of an aircraft. The housing is disposed outboard of a fuselage of the aircraft. The example apparatus also includes a cryogenic fuel tank bundle substantially filling a space inside the housing.

The features, functions and advantages that have been discussed can be achieved independently in various examples or may be combined in yet other examples further details of which can be seen with reference to the following description and drawings.

Figure 1A:
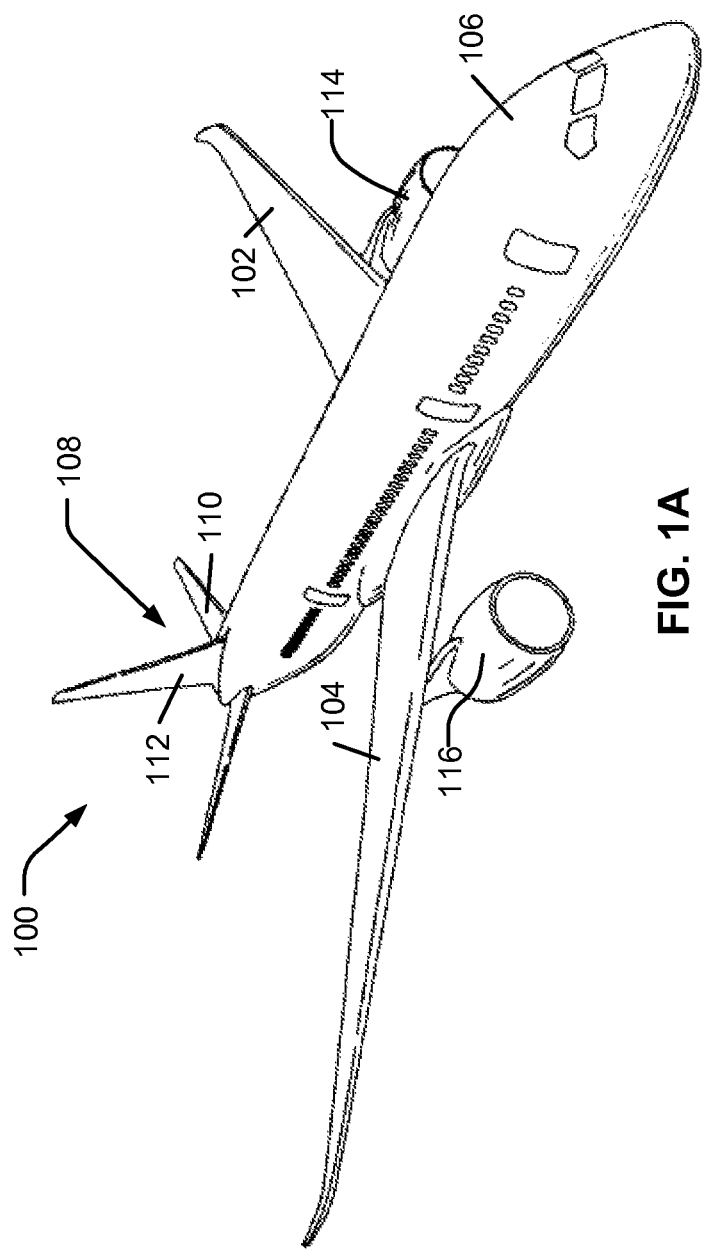
FIG. 1A is a front, perspective view of an example aircraft in which aspects of the present disclosure may be implemented.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DESCRIPTION

Cryogenic fuel tanks for use in aircraft structures are disclosed herein. In some examples, one or more fuel tanks disclosed herein form a fuel tank bundle. For example, the fuel tank bundle may include rows, columns and/or any other arrangement and/or array of fuel tanks. The fuel tanks may hold, store and/or supply a cryogenic fuel such as, for example, liquidized methane, a mixture of liquidized propane and butane, liquidized hydrogen, and/or any other cryogenic fuel. In some examples, the fuel tank bundle extends into and/or is disposed inside an aircraft structure outboard a fuselage of the aircraft. For example, the fuel tank bundle may be disposed inside a wing, a stabilizer (e.g., a horizontal stabilizer, a vertical stabilizer, an angled stabilizer, a canard and/or any other type of stabilizer), an empennage strut, a wing strut, an engine pylon or strut, and/or any other aircraft structure disposed outboard the fuselage.

In some examples, the fuel tank bundle is a load bearing component of the aircraft structure. In some examples, the aircraft structure has an airfoil-shaped cross-section, and an aerodynamic load is applied to the aircraft structure. An aircraft structure having an airfoil-shaped cross-section is referred to herein as an airfoil-shaped structure. In some examples, the aircraft structure is a semi-monocoque structure. In some examples, the fuel tank bundle substantially fills a space inside a housing of the aircraft structure. As referred herein, a housing of an aircraft is a portion of an aircraft structure substantially defining a space or volume in which an example fuel tank bundle is to be disposed. For example, the fuel tank bundle may substantially fill a space inside a wing box of the wing. In some examples, the example fuel tank bundle is coupled to the housing to enable the fuel tanks to support a first portion of the aerodynamic load. In some examples, the fuel tanks are coupled to a skin of the aircraft housing via supports (e.g., ribs), which may support a second portion of the aerodynamic load. Fuel flow passageways of the fuel tanks may extend through the supports. In some examples, the fuel tanks support a structural load applied the aircraft structure. For example, the fuel tank bundle may be disposed in a strut supporting a wing to bear a portion of a structural load applied to the strut by the wing. In some examples, the fuel tank bundle is disposed inside the aircraft structure and does not support an aerodynamic load and/or a structural load applied to the aircraft structure.

In some examples disclosed herein, the fuel tanks include thermally insulating layers (e.g., plenum spaces, thermal insulation, etc.) to reduce and/or minimize heat transfer into the fuel tanks. In some examples, the fuel tanks include baffles to impede fuel flow inside the fuel tanks and/or control a distribution of the fuel within the fuel tanks. In some examples, one or more vents are in fluid communication with the fuel tanks to enable vapors to escape from the fuel tanks and/or provide a surge volume for the fuel tank bundle. In some examples, the fuel tank bundle includes a network of supports to provide rigidity and/or stiffness to the example fuel tanks to enable the fuel tanks to support the first portion of the aerodynamic load and/or the structural load.

In some examples, the fuel tanks include sections having different sizes, shapes and/or orientations to enable the fuel tank bundle to substantially fill a space or volume inside the aircraft structure. For example, some of the fuel tanks may extend from a first end of the housing to a second end of the housing, and some of the fuel tanks may have ends adjacent a curve or corner defined by the housing between the first end and the second end. In some examples, cross-sectional sizes (e.g., diameters, etc.) of the fuel tanks increase or decrease to substantially fill the space.

FIG. 1A is a perspective view of an example aircraft 100 in which aspects of the present disclosure may be implemented. The example aircraft 100 of FIG. 1A includes a first wing 102, a second wing 104 and a fuselage 106. The example aircraft 100 also includes an empennage or tail 108 having a horizontal stabilizer 110 and a vertical stabilizer 112. In the illustrated example, a first nacelle 114 is coupled to the first wing 102. A second nacelle 116 is coupled to the second wing 104. The aircraft 100 of FIG. 1A is merely an example and, thus, other aircrafts such as, for example, an open-fan aircraft, a catamaran aircraft, and/or any other type of aircrafts may be used without departing from the scope of this disclosure.

Figure 1B:
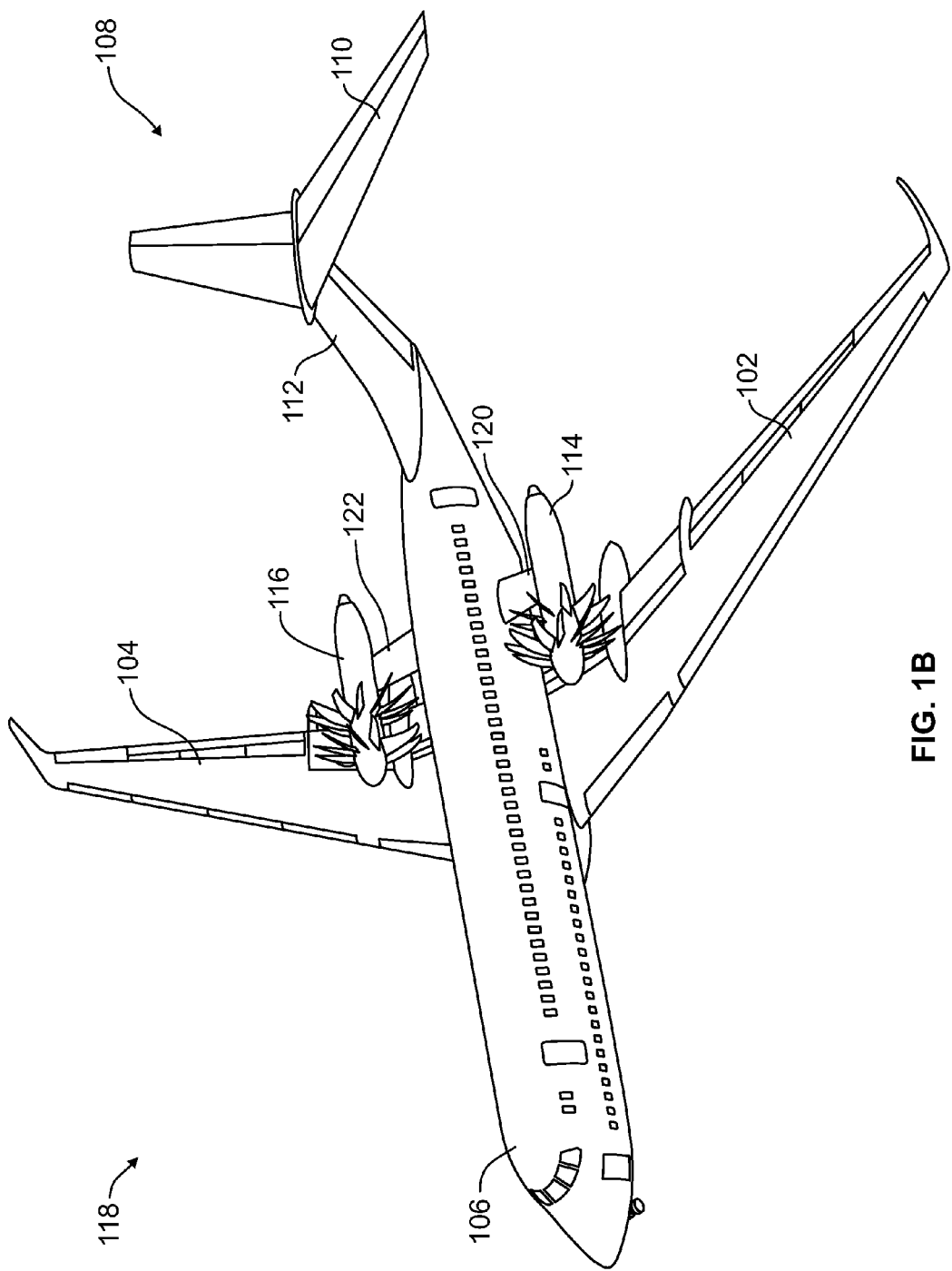
FIG. 1B is a front, perspective view of another example aircraft in which aspects of the present disclosure may be implemented.

FIG. 1B is a perspective view of another example aircraft 118 in which aspects of the present disclosure may be implemented. The example aircraft 118 of FIG. 1B includes a first wing 102, a second wing 104 and a fuselage 106. The example aircraft 118 also includes an empennage or tail 108 having a horizontal stabilizer 110 and a vertical stabilizer 112. In the illustrated example, a first nacelle 114 and a second nacelle 116 are coupled to the fuselage 106 via a first engine support 120 and a second engine support 122, respectively. In the illustrated example, the first engine support 120 and the second engine support 122 are struts having airfoil-shaped cross-sections. The aircraft 118 of FIG. 1B is merely an example and, thus, other aircrafts may be used without departing from the scope of this disclosure.

Figure 1C:
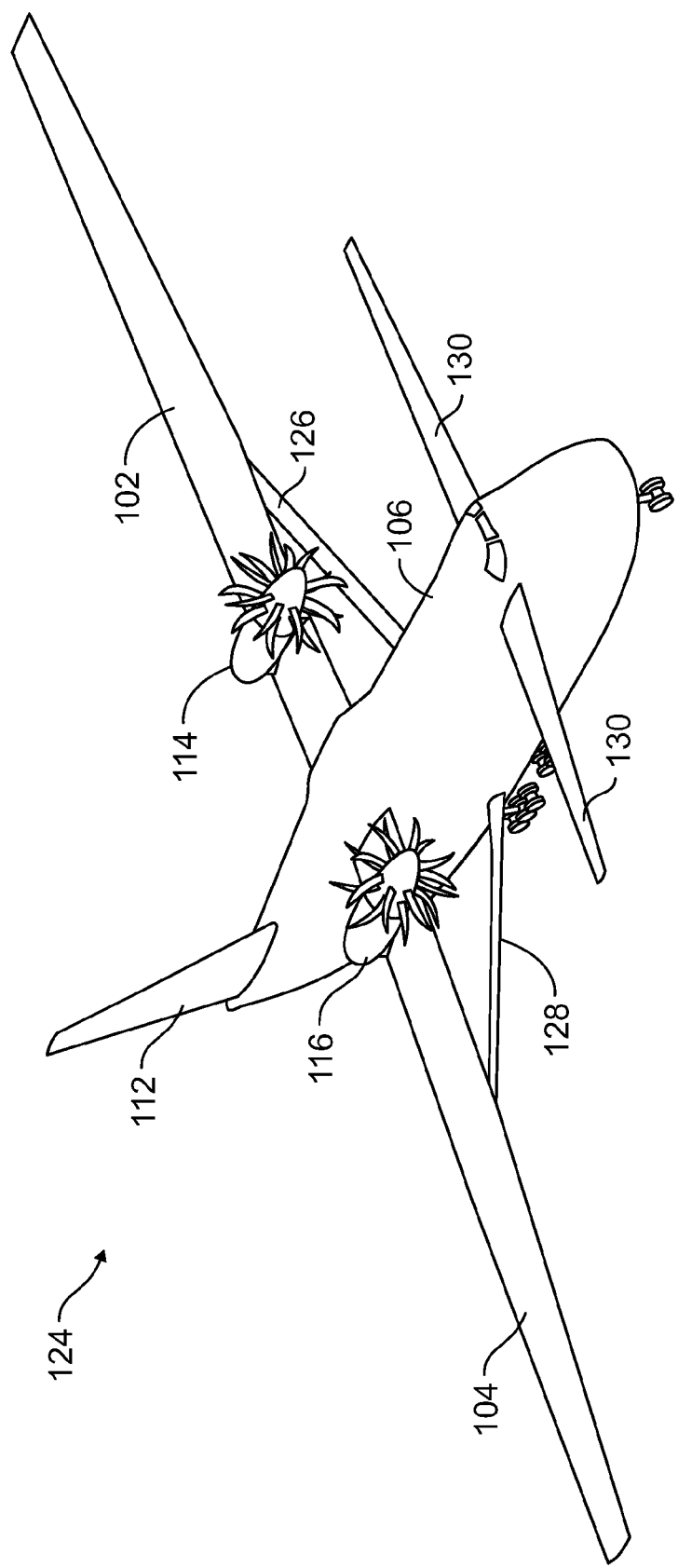
FIG. 1C is a front, perspective view of another example aircraft in which aspects of the present disclosure may be implemented.

FIG. 1C is a perspective view of another example aircraft 124 in which aspects of the present disclosure may be implemented. The example aircraft 124 of FIG. 1C includes a first wing 102, a second wing 104 and a fuselage 106. In the illustrated example, the first wing 102 and the second wing 104 are supported via a first wing support 126 and a second wing support 128, respectively. In the illustrated example, the first wing support 126 extends from the fuselage 106 to the first wing 102, and the second wing support 128 extends from the fuselage 106 to the second wing 104. In the illustrated example, the first wing support 126 and the second wing support 128 are struts having airfoil-shaped cross-sections. The example aircraft 124 also includes a vertical stabilizer 108 and a canard wing 130. In the illustrated example, a first nacelle 114 and a second nacelle 116 are coupled the first wing 102 and the second wing 104, respectively. The aircraft 124 of FIG. 1C is merely an example and, thus, other aircrafts may be used without departing from the scope of this disclosure.

Although the following example fuel tank bundle 216 (FIG. 2) is described in conjunction with the example first wing 102 of the example aircraft 100 of FIG. 1A, the methods and apparatus disclosed herein may be used in conjunction with any other aircraft structure disposed outboard a fuselage. For example, the fuel tank bundle 216 may be disposed inside the first wing 102 of the example aircrafts 118, 124 of FIGS. 1B and 1C. Moreover, the example fuel tank bundle 216 may be disposed inside the second wing 104, the horizontal stabilizer 110, the vertical stabilizer 112, the canard wing 130, an engine pylon, the first wing support 126, the second wing support 128, the first engine support 120, the second engine support 122, and/or any other aircraft structure(s) of the example aircrafts 100, 118, 124 of FIGS. 1A-1C and/or any other aircraft. In some examples, the aircraft structure supports aerodynamic and/or structural loads. For example, the first wing support 126 may support aerodynamic loads such as lift and a structural load such as weight of a wing.

Figure 2:
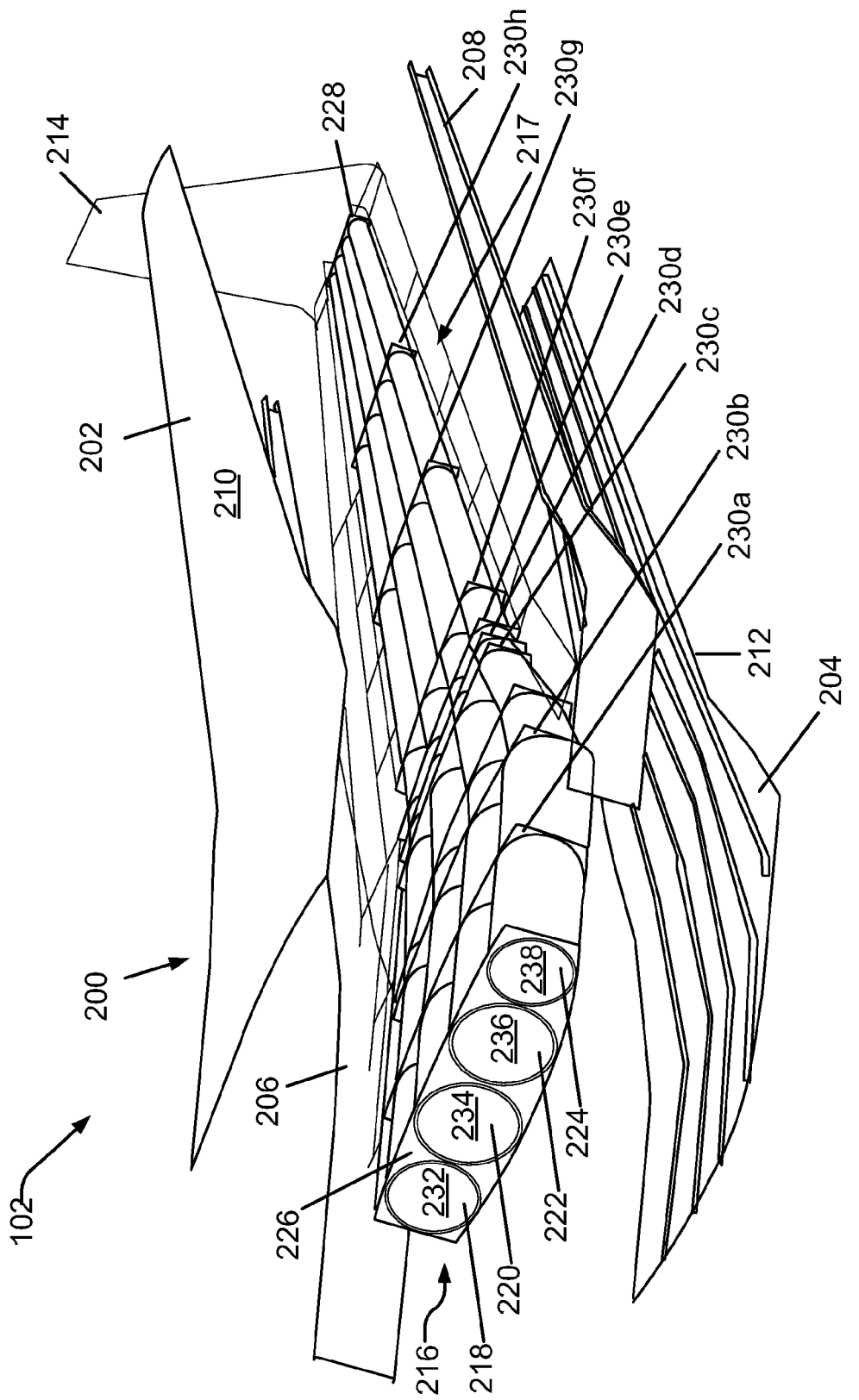
FIG. 2 is an exploded view illustrating an example fuel tank bundle disposed inside a wing box of the example aircraft of FIG. 1A.

FIG. 2 is an exploded view of the example first wing 102 of the aircraft 100 of FIG. 1A. In the illustrated example, the first wing 102 includes a wing box 200. The example wing box 200 includes an upper panel 202, a lower panel 204, a first spar 206 and a second spar 208. The example upper panel 202 and the example lower panel 204 define a first aerodynamic surface 210 and a second aerodynamic surface 212, respectively, of the example first wing 102 (e.g., the upper panel 202 and the lower panel 204 define a portion of an airfoil-shaped cross-section of the first wing 102). In some examples, the first wing 102 includes one or more control surfaces such as, for example an aileron, a flap, a spoiler, etc. The example first wing 102 also includes a winglet 214. During flight, an aerodynamic load (e.g., lift) is applied to the example first wing 102. As a result, tension, compressive and/or shear forces and/or torsion loads are applied to the example wing box 200. As described in greater detail below, a fuel tank bundle 216 disposed inside the wing box 200 supports a first portion of the aerodynamic load.

The example wing box 200 of FIG. 2 forms a housing to receive the fuel tank bundle 216. As referred herein, a housing of an aircraft is a portion of an aircraft structure substantially defining a space or volume in which an example fuel tank bundle is to be disposed. The example wing box 200 is merely an example and, thus, example fuel tank bundles are disposed in other housings in other examples. The example fuel tank bundle 216 of FIG. 2 substantially fills a space 217 inside the wing box 200. In the illustrated example, the fuel tank bundle 216 includes a first tank 218, a second tank 220, a third tank 222 and a fourth tank 224. In other examples, the fuel tank bundle 216 includes other numbers of tanks (e.g., 1, 2, 3, 5, 6, . . . 20, . . . 30, etc.) The example tanks 218, 220, 222, 224 are disposed in a row (e.g., side-by-side) and extend spanwise from a root rib 226 to a tip rib 228. In other examples, the tanks 218, 220, 222, 224 are arranged in other ways (e.g., in rows and columns, forming a lattice, in an asymmetric arrangement, and/or via any other arrangement). In some examples, the fuel tank bundle 216 is coupled to the fuselage 106 via the root rib 226. In some examples, the fuel tank bundle 216 extends into the fuselage 106 and/or other portion of the example aircraft 100. The example tip rib 228 is coupled to and/or adjacent the winglet 214.

The example tanks 218, 220, 222, 224 are coupled together via the root rib 226, the tip rib 228 and intermediary ribs 230a-230h. In the illustrated example, fuel passageways 232, 234, 236, 238 of the tanks 218, 220, 222, 224 extend through the root rib 226, the intermediary ribs 230a-230h and the tip rib 228. The root rib 226, the tip rib 228 and the intermediary ribs 230a-230h are coupled to the first spar 206, the second spar 208, the upper panel 202 and the lower panel 204. As a result, the root rib, 226, the intermediary ribs 230a-230h, and the tip rib 228 support a second portion of the aerodynamic load. Thus, the ribs 226, 228, 230a-230h, the tanks 218, 220, 222, 224, the first spar 206, the second spar 208, the upper panel 202 and the lower panel 204 cooperate to support the aerodynamic load applied to the first wing 102.

The example tanks 218, 220, 222, 224 of FIG. 2 support the first portion of the aerodynamic load applied to the first wing 102 to substantially maintain a shape of the wing box 200 and/or resist, reduce, minimize and/or prevent deformation (e.g., bending, twisting, etc.) of the first wing 102. For example, the aerodynamic load may urge the first wing 102 to twist, flex and/or bend, thereby applying shear, compressive and/or tension forces to the wing box 200. Because the example tanks 218, 220, 222, 224 are coupled to the upper panel 202 and the lower panel 204 via the root rib, 226, the intermediary ribs 230a-230h and the tip rib 228, the tanks 218, 220, 222, 224 support a portion of the shear, compression and/or tension forces and/or bending and/or torsion loads that are transferred to the tanks 218, 220, 222, 224 via the ribs 226, 228, 230a-230h.

In some examples, the fuel tank bundle 216 is disposed in an aircraft structure that supports a structural load, and the tanks 218, 220, 222, 224 support a portion of the structural load applied to the aircraft structure. For example, the fuel tank bundle 216 may be disposed inside the first wing support 126 of the example aircraft of FIG. 1C (e.g., a strut). The fuel tank bundle 216 may be coupled to the first wing support 126 via a skin of the first wing support 126, one or more ribs and/or spars of the first wing support 126, and/or any other component(s) of the first wing support 126. In some examples, the fuel tank bundle 216 supports a portion of an aerodynamic load and a portion of a structural load applied to an aircraft structure in which the fuel tank bundle 216 is disposed.

Figure 3:
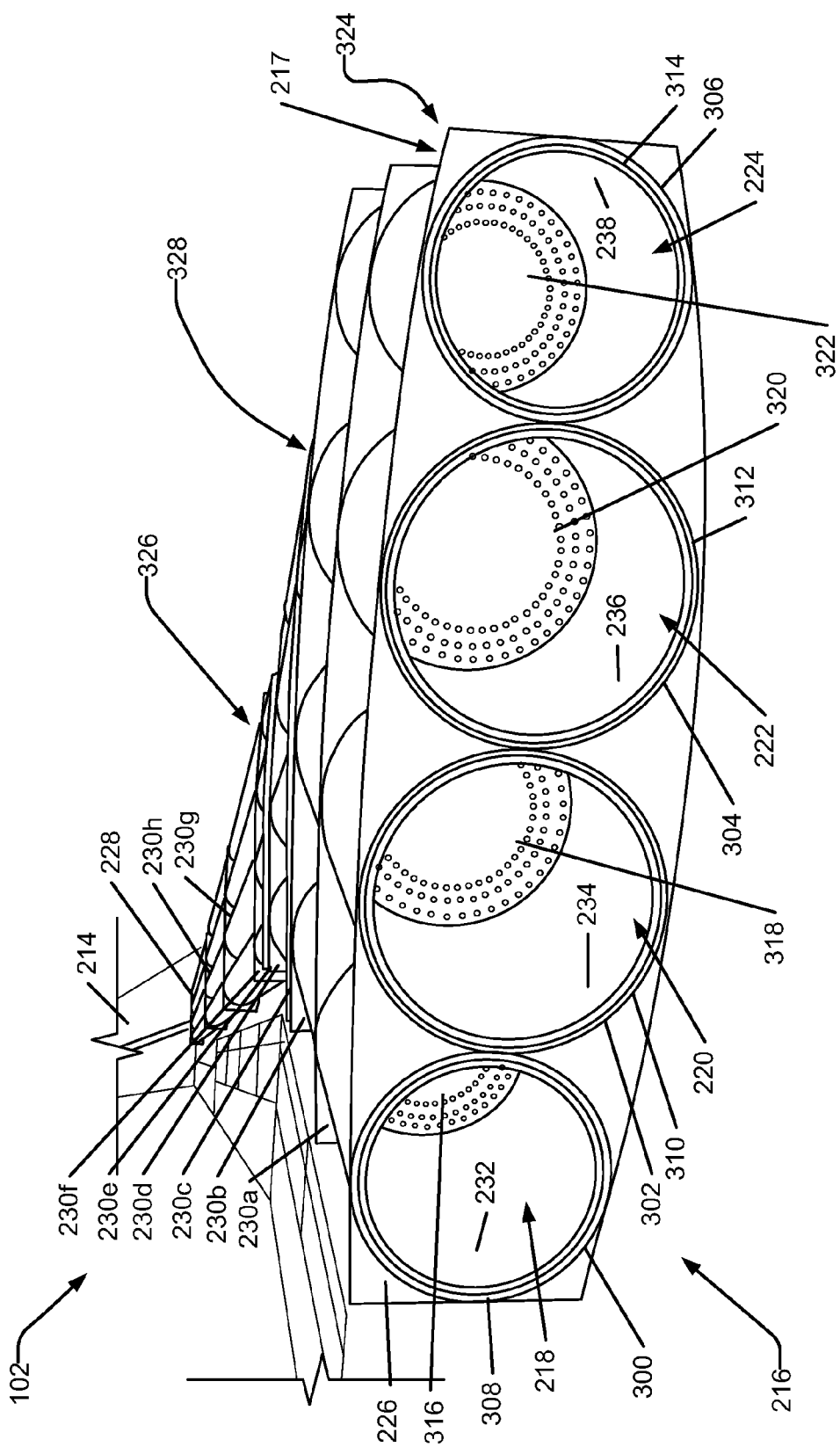
FIG. 3 illustrates a root end of the example fuel tank bundle of FIG. 2.

FIG. 3 is a perspective view of the example fuel tank bundle 216 of FIG. 2. In the illustrated example, the root rib 226, the intermediary ribs 230a-230h and the tip rib 228 each define a first aperture 300, a second aperture 302, a third aperture 304 and a fourth aperture 306. In some examples, the first tank 218 extends through the first aperture 300, the second tank 220 extends through the second aperture 302, the third tank 222 extends through the third aperture 304, and the fourth tank 224 extends through the fourth aperture 306. In some examples, the tanks 218, 220, 222, 224 are coupled to the sides of the ribs 226, 228, 230a-230h such that the ribs 226, 228, 230a-230h define portions of the fuel passageways 232, 234, 236, 238. As a result, a portion of the compression, tension and/or shear forces and/or bending and/or torsion loads applied to the wing box 200 is transferred to the tanks 218, 220, 222, 224 via the root rib 226, the intermediary ribs 230a-230h and/or the tip rib 228.

The example tanks 218, 220, 222, 224 of FIGS. 2-3 receive, store and/or supply a cryogenic fuel such as, for example, liquidized methane, a mixture of liquidized propane and butane, liquidized hydrogen, and/or any other cryogenic fuel. If heat is transferred into the cryogenic fuel, a portion of the cryogenic fuel may change from a liquid to a vapor or gas. As a result, a pressure of the tanks 218, 220, 222, 224 may increase. The example tanks 218, 220, 222, 224 are capable of supporting and/or withstanding the pressure. The example fuel tanks 218, 220, 222, 224 of FIGS. 2-3 each include a thermally insulating layer 308, 310, 312, 314 substantially surrounding a respective one of the fuel passageways 232, 234, 236, 238 to minimize and/or reduce heat transfer into the fuel passageways 232, 234, 236, 238 and, thus, the cryogenic fuel. In the illustrated example, the thermally insulating layers 308, 310, 312, 314 are plenum spaces. In other examples, the thermally insulating layers 308, 310, 312, 314 include thermal insulation. In some examples, the fuel tanks 218, 220, 222, 224 include ducts and shells surrounding the ducts. The ducts define the fuel passageways 232, 234, 236, 238 and spaces between the ducts and the shells define and/or receive the thermally insulating layers 308, 310, 312, 314. In some examples, the fuel tank bundle 216 includes a cooling and/or refrigeration system to cool the cryogenic fuel and/or maintain the cryogenic fuel at a desired temperature and/or within a desired temperature range.

In the illustrated example, the tanks 218, 220, 222, 224 include baffles 316, 318, 320, 322 disposed inside the fuel passageways 232, 234, 236, 238 to control fuel flow within the fuel passageways 232, 234, 236, 238. For example, the baffles 316, 318, 320, 322 may reduce and/or minimize sloshing of the cryogenic fuel, impede fuel flow in a given direction (e.g., spanwise), control a distribution of the cryogenic fuel with the tanks 218, 220, 222, 224 (e.g., prevent the cryogenic fuel from concentrating near the fuselage 106 or the winglet 214 when the aircraft 100 turns during flight) and/or control the fuel flow in other ways. In the illustrated example, the baffles 316, 318, 320, 322 are perforated bulkheads. In other examples, the baffles 316, 318, 320, 322 are permeable membranes and/or other types of baffles. In some examples, each of the tanks 218, 220, 222, 224 includes a plurality of baffles spaced apart (e.g., spanwise) to, for example, divide the fuel passageways 232, 234, 236, 238 into a plurality of compartments. In some examples, the fuel tank bundle 216 includes fuel lines and/or pumps in fluid communication with the tanks 218, 220, 222, 224 to flow the cryogenic fuel from the tanks 218, 220, 222, 224 to one or more engines of the aircraft 100; between the tanks 218, 220, 222, 224; from one or more of the tanks 218, 2220, 222, 224 to one or more other tanks disposed on the aircraft 100; and/or from the other tank(s) to one or more of the tanks 218, 220, 222, 224. In some examples, the fuel passageways 232, 234, 236, 238 define a topological volume.

The example tanks 218, 220, 222, 224 have sizes, shapes and/or orientations to enable the tanks 218, 220, 222, 224 to substantially fill the space 217 inside the wing box 200. In the illustrated example, the tanks 218, 220, 222, 224 of FIG. 3 have substantially circular cross-sectional shapes. In other examples, the tanks 218, 220, 222, 224 have other cross-sectional shapes. In the illustrated example, cross-sectional sizes of the tanks 218, 220, 222, 224 conform to a cross-sectional shape (e.g., an airfoil-shape) and a cross-sectional size of the wing box 200. For example, the first tank 218 and the fourth tank 224 have smaller cross-sectional sizes (e.g., diameters) than the second tank 220 and the third tank 222 to substantially fill portions of the space 217 adjacent and/or along the first spar 206 and the second spar 208, respectively. The example second tank 220 and the example third tank 222 have larger cross-sectional sizes than the first tank 218 and the fourth tank 224 to substantially fill a portion of the space 217 inside the wing box 200 between the first tank 218 and the fourth tank 224.

A planform (e.g., a shape when viewed from above in the orientation of FIG. 3) of the example fuel tank bundle 216 substantially conforms to a planform of the wing box 200 to enable the fuel tank bundle 216 to substantially fill the space 217 inside the wing box 200. For example, the wing box 200 of FIGS. 2-3 includes a rectangular portion 324 and a trapezoidal portion 326. In the illustrated example, the tanks 218, 220, 222, 224 are disposed in a first orientation (e.g., at a first angle relative to the root rib 226) within the rectangular portion 324. The example tanks 218, 220, 222, 224 are disposed in a second orientation (e.g., a second angle relative to the root rib 226) within the trapezoidal portion 326. Thus, the fuel tank bundle 216 includes a bend or corner 328 to conform to the planform of the wing box 200. In the illustrated example, sections of the tanks 218, 220, 222, 224 within the rectangular portion 324 of the wing box 200 are substantially cylindrical.

Figure 4:
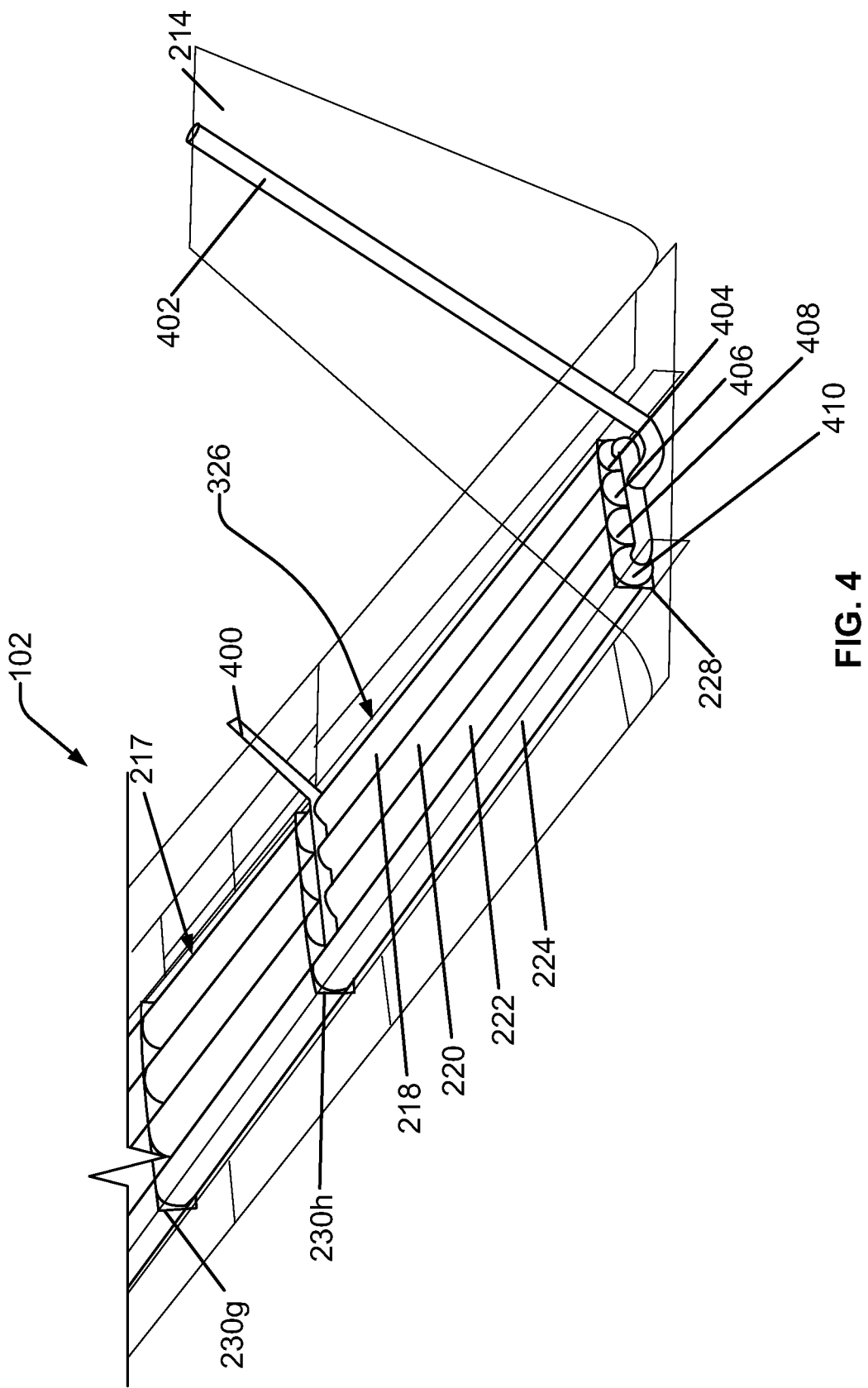
FIG. 4 is a perspective view of a tip end of the example fuel tank bundle of FIGS. 2-3.

FIG. 4 is another perspective view of the example fuel tank bundle 216 of FIGS. 2-3. In the illustrated example, a chord of the wing box 200 along the trapezoidal portion 326 decreases from the rectangular portion 324 (FIG. 3) to the winglet 214. Thus, the cross-sectional sizes of the example tanks 218, 220, 222, 224 decrease along the trapezoidal portion 326 to enable the tanks 218, 220, 222, 224 to substantially fill the space 217 within the wing box 200. In the illustrated example, sections of the tanks 218, 220, 222, 224 within the trapezoidal portion 326 are tapered or frustum shaped. In other examples, the fuel tank bundle 216 has other cross-sectional shapes and/or sizes to substantially fill spaces in other aircraft structures having other shapes and/or sizes.

In the illustrated example, a first vent 400 and a second vent 402 are in fluid communication with the first tank 218, the second tank 220, the third tank 222 and the fourth tank 224. The example first vent 400 is coupled to the tanks 218, 220, 222, 224 adjacent the intermediary rib 230h. The example second vent 402 is coupled to the tanks 218, 220, 222, 224 via caps 404, 406, 408, 410 coupled to the tanks 218, 220, 222, 224 and/or the tip rib 228. In the illustrated example, the caps 404, 406, 408, 410 are hemispherical. In other examples, the caps 404, 406, 408, 410 are other shapes. The example vents 400, 402 vent vapor from the tanks 218, 220, 222, 224, thereby reducing pressures within the tanks 218, 220, 222, 224. In the illustrated example, the vents 400, 402 also provide surge volumes to receive vapor and/or the cryogenic fuel. The example second vent 402 of FIG. 4 directs the vapor out of the example first wing 102 via the winglet 214.

Figure 5:
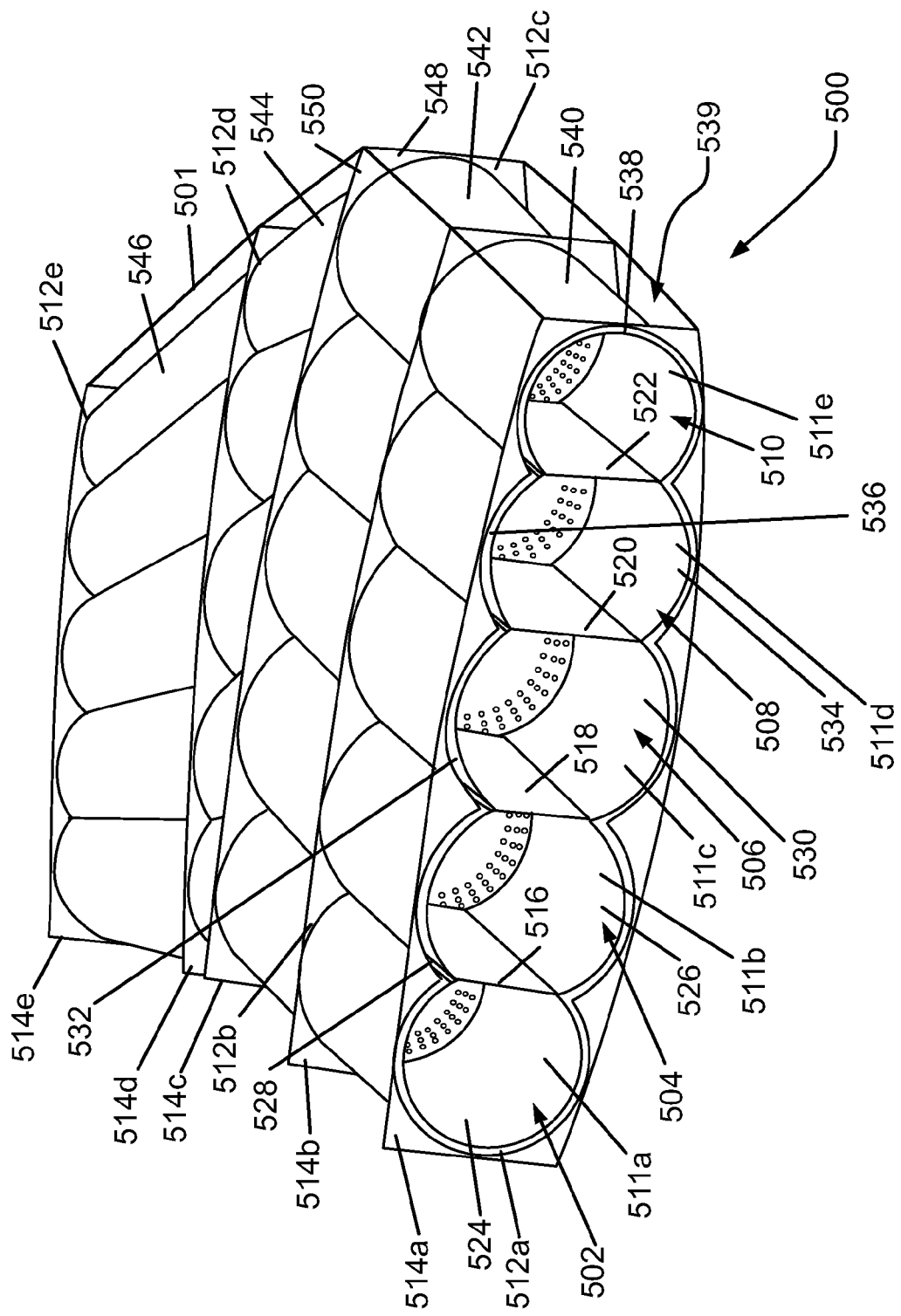
FIG. 5 is a perspective view of another example fuel tank bundle disclosed herein.

FIG. 5 is a cutaway view of another example fuel tank bundle 500 disclosed herein. The example fuel tank bundle 500 of FIG. 5 is disposed inside an aircraft housing 501 such as, for example, the first wing 102, the second wing 104, the horizontal stabilizer 110, the vertical stabilizer 112, the canard wing 130, an engine pylori, the first wing support 126, the second wing support 128, the first engine support 120, the second engine support 122, and/or any other aircraft structure(s) of the example aircrafts 100, 118, 124 of FIGS. 1A-1C and/or any other aircraft structure disposed outboard a fuselage of any other aircraft. The example fuel tank bundle 500 of FIG. 5 includes a first tank 502, a second tank 504, a third tank 506, a fourth tank 508 and a fifth tank 510. Other examples include other numbers of tanks (e.g., 1, 2, 3, 4, 6, . . . 10, . . . 20, etc.). In the illustrated example, the tanks 502, 504, 506, 508, 510 are disposed in a row. In other examples, the tanks 502, 504, 506, 508, 510 are disposed in other arrangements. In the illustrated example, the first tank 502 is directly coupled to the second tank 504; the second tank 504 is directly coupled to the third tank 506; the third tank 506 is directly coupled to the fourth tank 508; and the fourth tank 508 is directly coupled to the fifth tank 510. The example tanks 502, 504, 506, 508, 510 define fuel passageways 511a-511e extending through apertures 512a-512e defined by ribs 514a-e. In the illustrated example, a shape of the apertures 512a-512e corresponds to (e.g., is similar or identical to) a shape of the fuel tank bundle 500. In the illustrated example, the tanks 502, 504, 506, 508, 510 are coupled to and/or supported (e.g., carried) by the ribs 514a-514c. In some examples, the fuel tank bundle 500 includes a thermally insulating layer (e.g., a plenum space, thermal insulation, and/or any other insulating layer(s)) surrounding portions of the fuel passageways 511a-511e.

In some examples, the fuel tank bundle 500 supports a portion of an aerodynamic load and/or a structural load applied to the housing 501. For example, the fuel tank bundle 500 may be coupled to a skin defining an aerodynamic surface. During flight, the skin transfers the portion of the aerodynamic load to the tanks 502, 504, 506, 508, 510 via the ribs 514a-514e. In some examples, the fuel tank bundle 500 is coupled to the housing 501 to support a structural load applied to the housing 501. For example, the housing 501 may used to implement the first engine support 120 coupled to the fuselage 106 and the first nacelle 114 of the example aircraft 118 of FIG. 1B to support the first nacelle 114. The fuel tank bundle 500 may be coupled to one or more ribs, spars and/or a skin of the housing 501 to support a portion of the load applied to the housing 501 by the first nacelle 114.

In the illustrated example, the first tank 502 and the fifth tank 510 have lobe-shaped cross-sectional shapes. The example second tank 504, the example third tank 506 and the example fourth tank 508 have rounded-rectangular cross-sectional shapes. Thus, the example fuel tank bundle 500 includes a first wall 516, a second wall 518, a third wall 520 and a fourth wall 522 that are substantially planar. However the above-noted shapes are merely examples and, thus, other shapes may be used without departing from the scope of this disclosure. The example walls 516, 518, 520, 522 are oriented (e.g., substantially perpendicular to the first rib 514) to provide stiffness to the fuel tank bundle 500 and/or support forces (e.g., tension, compression and/or shear forces) and/or torsion loads applied of the fuel tank bundle 500. In some examples, curved portions 524, 526, 528, 530, 532, 534, 536, 538 of the example tanks 502, 504, 506, 508, 510 cooperate with the walls 516, 518, 520, 522 to support the portion of the aerodynamic load(s) and/or the structural load(s) applied to the housing 501.

In some examples, the tanks 502, 504, 506, 508, 510 employ a plurality of sections to enable the tanks 502, 504, 506, 508, 510 to substantially fill a space 539 inside the housing 501. For example, the fifth tank 510 includes a first section 540, a second section 542, a third section 544 and a fourth section 546. In some examples, the fifth tank 510 includes other numbers of sections (e.g., 1, 2, 3, 5, 6, . . . 10, . . . 20, etc.). In the illustrated example, each of the sections 540, 542, 544, 546 is disposed between two of the ribs 514a-514e. In the illustrated example, the second section 542 and the third section 544 are disposed at different orientations relative to the rib 514c to enable the fifth tank 510 to follow and/or conform to a shape (e.g., a corner or angle) of the housing 501 and, thus, substantially fill a portion of the space 539. For example, the second section 542 is at a first angle (e.g., a right or substantially 90 degree angle) relative to the rib 514c and the third section 544 is at a second angle different than the first angle. In some examples, the second section 542 is coupled directly to the third section 544. In some examples, the second section 542 is coupled to a first side 548 of the rib 514c, and the third section 544 is coupled to a second side 550 of the rib 514c. In the illustrated example, the sections 540, 542, 544, 546 are substantially cylindrical. In other examples, the sections 540, 542, 544, 546 are other shapes (e.g., tapered or frustum shaped, curved, and/or any other shape).

Figure 6:
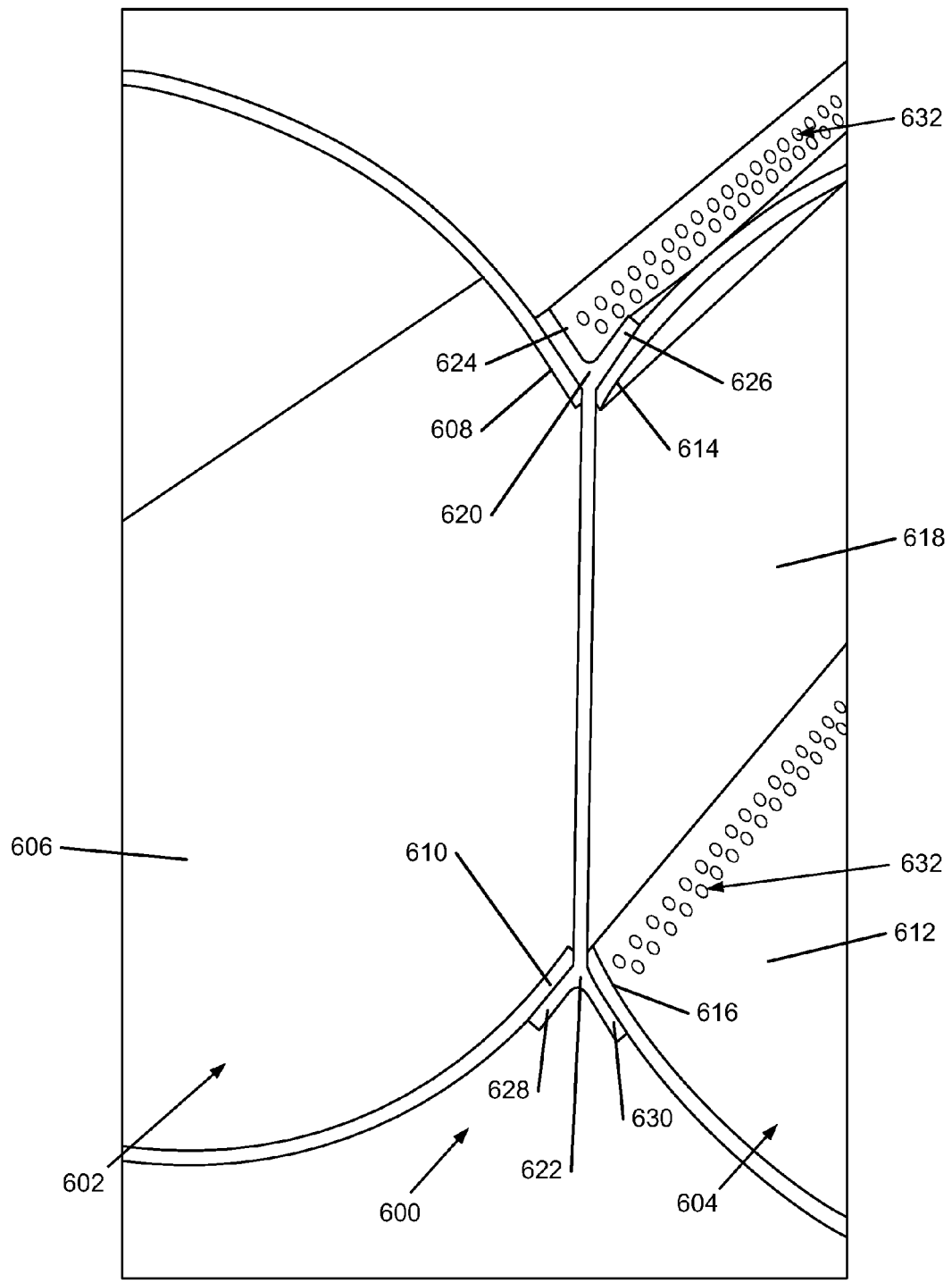
FIG. 6 illustrates an example joint between two fuel tanks, which may be used to implement the example fuel tank bundle of FIG. 5.

FIG. 6 illustrates an example joint 600 coupling a first tank 602 directly to a second tank 604. The example joint 600 may be used to form the example fuel tank bundle 500 of FIG. 5. In the illustrated example, the first tank 602 includes a first curved portion 606 having a first end 608 and a second end 610. The example second tank 604 includes a second curved portion 612 having a third end 614 and a fourth end 616. In the illustrated example, the first curved portion 606 is coupled to the second curved portion 606 via a wall 618. In the illustrated example, the wall 618 is substantially planar. The example wall 618 includes a first V-shaped flange 620 and a second V-shaped flange 622. Other examples have flanges of other shapes. In the illustrated example, the first end 608 of the first curved portion 606 is coupled to a first prong 624 of the first V-shaped flange 620. The third end 614 of the second curved portion 612 is coupled to a second prong 626 of the first V-shaped flange 620. The second end 610 of the first curved portion 606 is coupled to a third prong 628 of the second V-shaped flange 620, and the fourth end 616 of the second curved portion 612 is coupled to a fourth prong 630 of the second V-shaped flange 620. In the illustrated example, the first curved portion 606 and the second curved portion 612 are coupled to the first V-shaped flange 620 and the second V-shaped flange 622 via a plurality of fasteners 632 (e.g., bolts, rivets, etc.) and/or a seam or weld. In other examples, the first curved portion 606 and the second curved portion 612 are coupled to the first V-shaped flange 620 and the second V-shaped flange 622 via other techniques.

Figure 7:
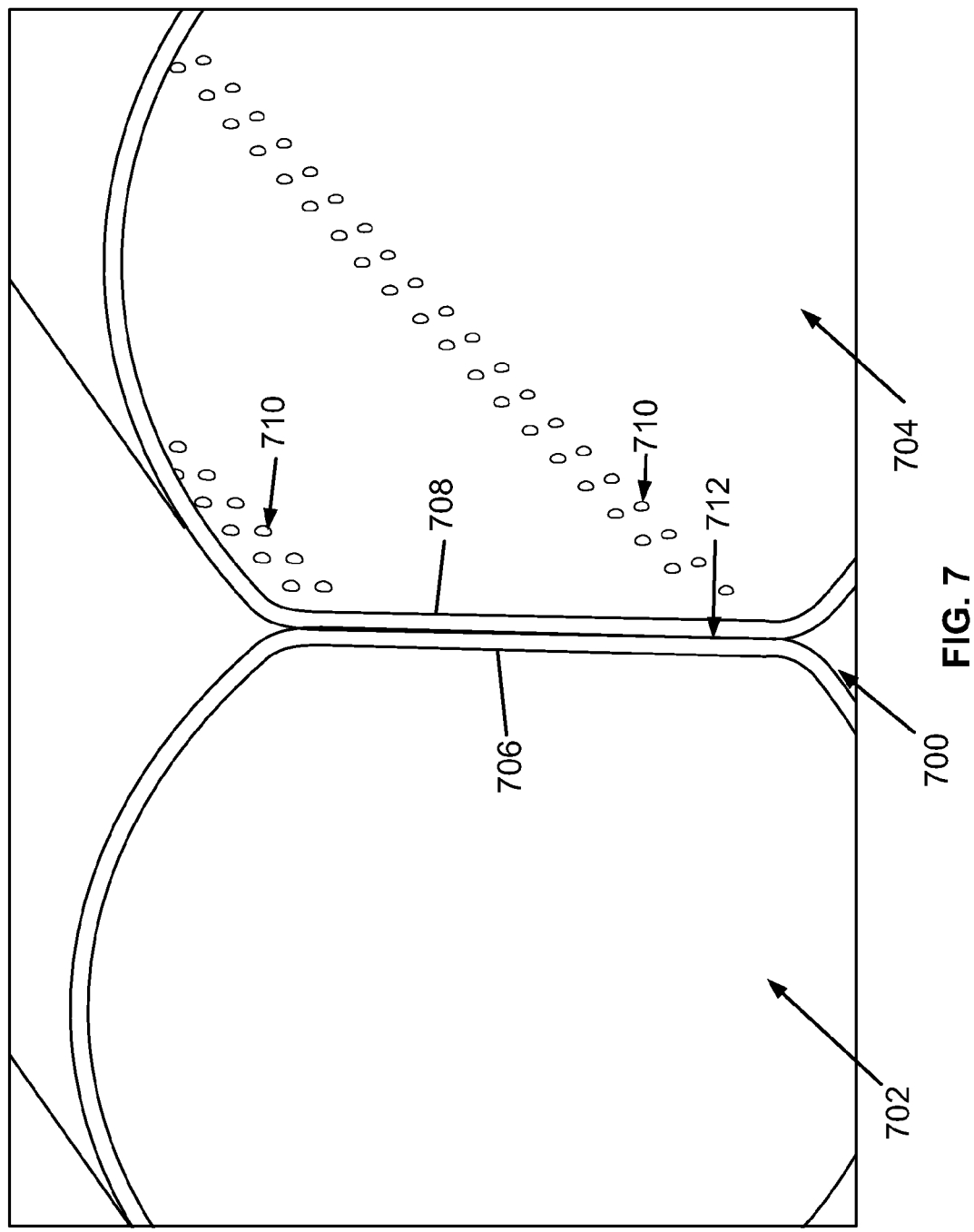
FIG. 7 illustrates another example joint between two fuel tanks, which may be used to implement the example fuel tank bundle of FIG. 5.

FIG. 7 illustrates another example joint 700 coupling a first tank 702 directly to a second tank 704. In some examples, the joint 700 of FIG. 7 is used to form the example fuel tank bundle 500 of FIG. 5. In some examples, prior to coupling the example first tank 702 to the example second tank 704, the first tank 702 and the second tank 704 are substantially cylindrical. During manufacture and/or assembly of the example first tank 702 and the example second tank 704, the first tank 702 and the second tank 704 are compressed (e.g., against each other) to substantially flatten a first side 706 of the first tank 702 and a second side 708 of the second tank 704. The first side 706 of the first tank 702 is then coupled to the second side 708 of the second tank 704 via, for example, fasteners 710, a seam, a weld, and/or any other couplings, thereby forming a substantially planar wall 712.

Figure 8:
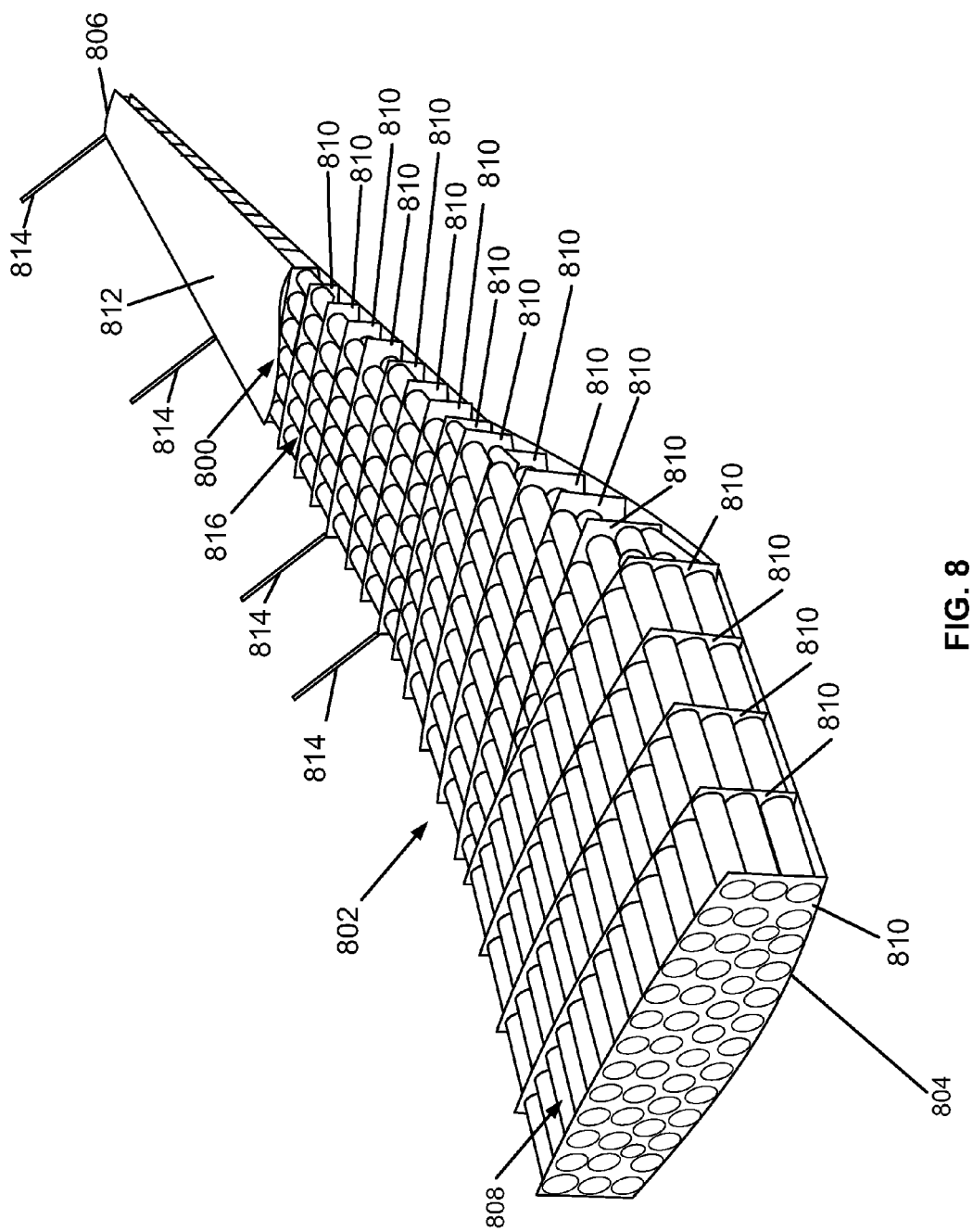
FIG. 8 is a perspective, cutaway view of another example fuel tank bundle disclosed herein.

FIG. 8 is a perspective, cutaway view of an example wing box 800 illustrating another example fuel tank bundle 802 disclosed herein. Although the following examples are described in conjunction with the wing box 800, the example fuel tank bundle 802 may be used in conjunction with any other aircraft structure. In the illustrated example, the fuel tank bundle 802 is disposed inside the wing box 800. The example wing box 800 includes a root end 804 (e.g., an end adjacent a fuselage) and a tip end 806. In the illustrated example, the fuel tank bundle 802 includes a plurality of fuel tanks 808 extending spanwise (e.g., from the root end 804 toward the tip end 806). In the illustrated example, the wing box 800 of FIG. 8 is substantially a same size as the example wing box 200 of FIG. 2. The example fuel tank bundle 802 of FIG. 8 has forty nine of the fuel tanks 808, and the fuel tank bundle 216 of FIG. 2 has four of the fuel tanks 218, 220, 222, 224. Thus, the example fuel tanks 808 of FIG. 8 have smaller cross-sectional sizes (e.g., diameters) than the fuel tanks 218, 220, 222, 224 of FIG. 2.

The example fuel tanks 808 of FIG. 8 are supported (e.g., suspended) by and/or extend through a plurality of ribs 810 disposed inside the wing box 800. In the illustrated example, skin 812 of the wing box 800 is coupled to the fuel tanks 808 via the ribs 810. The example fuel tanks 808 receive, store and/or supply cryogenic fuel. In the illustrated example, a plurality of vents 814 are in fluid communication with the fuel tanks 808 to release vapor produced within the fuel tanks 808 and/or receive a surge volume of the vapor and/or the cryogenic fuel. In some examples, each of the fuel tanks 808 includes and/or is at least partially surrounded by a thermally insulating layer (e.g., a plenum space).

In the illustrated example, the fuel tanks 808 substantially fill a space 816 inside the wing box 800. The example fuel tanks 808 of FIG. 8 are disposed in an array including rows and/or columns. In other examples, the fuel tanks 808 are disposed in other arrangements. In the illustrated example, a chord length (e.g., a distance from a leading edge to a trailing edge) of the wing box 800 is greater at the root end 804 than at the tip end 806. Thus, the chord length of the example wing box 800 of FIG. 8 decreases spanwise. In addition, a thickness of wing box 800 is greater at the root end 804 than at the tip end 806 and, thus, the thickness of the example wing box 800 of FIG. 8 decreases spanwise. Thus, to fill the space 816, a number of the fuel tanks 808 at the root end 804 is greater than a number of the fuel tanks 808 at the tip end 806. For example, some of the fuel tanks 808 extend from the root end 804 to the tip end 806, and some of the fuel tanks 808 end between the root end 804 and the tip end 806. In other examples, the fuel tank bundle 802 may be disposed inside an aircraft structure having a chord length and/or a thickness increasing and/or varying spanwise. As described in greater detail below in conjunction with FIG. 9, some of the fuel tanks 808 also employ different cross-sectional sizes, shapes and/or orientations to fill the example space 816.

Figure 9:
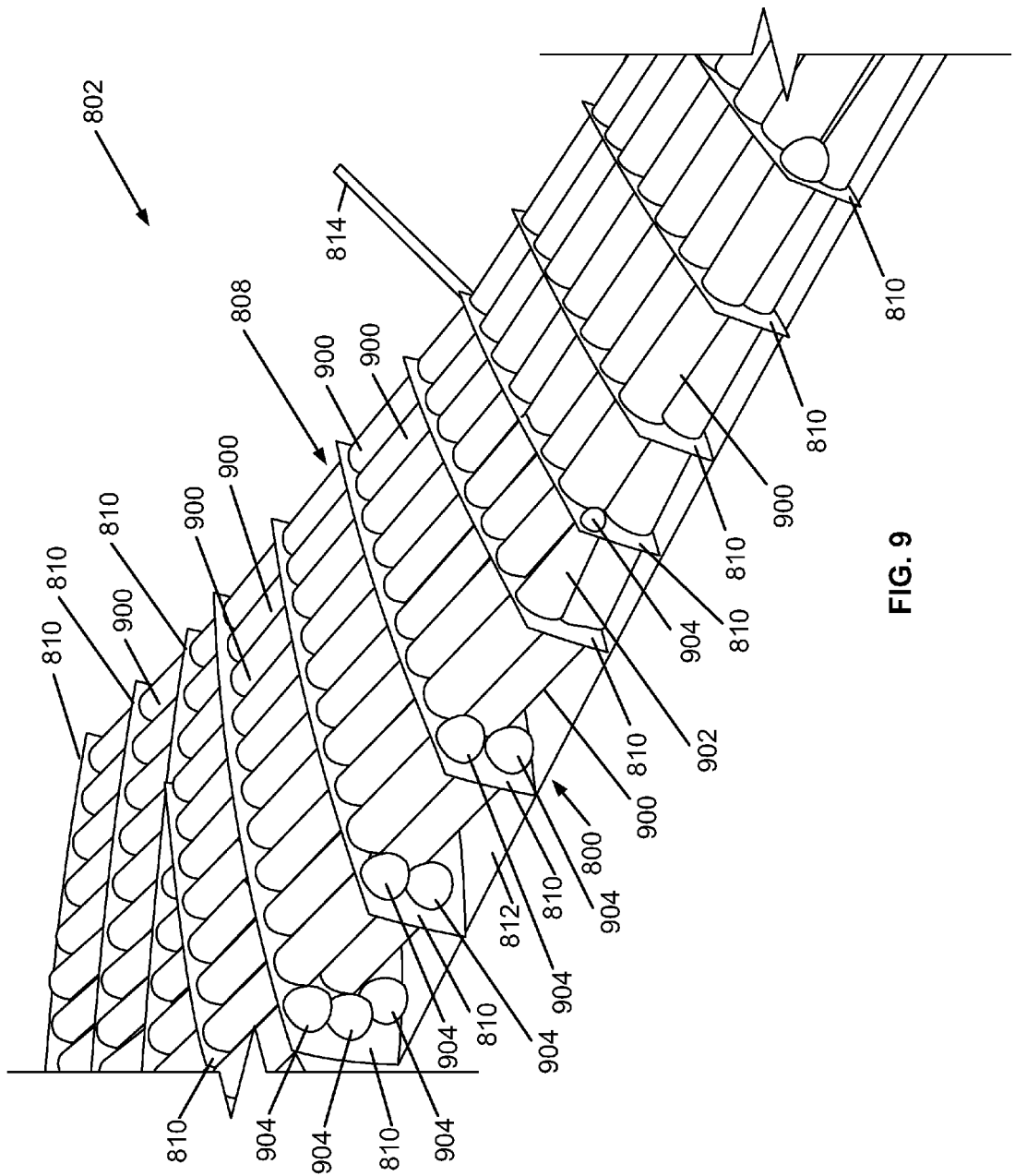
FIG. 9 is another perspective, cutaway view of the example fuel tank bundle of FIG. 8.

FIG. 9 illustrates another perspective, cutaway view of the example wing box 800 of FIG. 8. In the illustrated example, the fuel tanks 800 include cylindrical sections 900, tapered (e.g., frustum-shaped) sections 902, and/or cap sections 904 (e.g., hemispherical-shaped caps) to enable the fuel tank bundle 802 to substantially fill the space 816 inside the wing box 800. In some examples, two of the cylindrical sections 900 having different cross-sectional sizes (e.g., diameters, etc.) are in fluid communication via one or more of the tapered sections 902. In some examples, one of the cylindrical sections 900 is in fluid communication with one of the cap sections 904 via one or more of the tapered sections 902. The example cap sections 904 define ends of the tanks 808. Thus, cross-sectional sizes (e.g., diameters, etc.) of the tanks 808 may decrease as the tanks 808 extend from the root end 804 to the rip end 806 and/or the tanks 808 may end between the root end 804 and the tip end 806 to enable the fuel tank bundle 802 to substantially fill the space 816 inside the example wing box 800.

Figure 10:
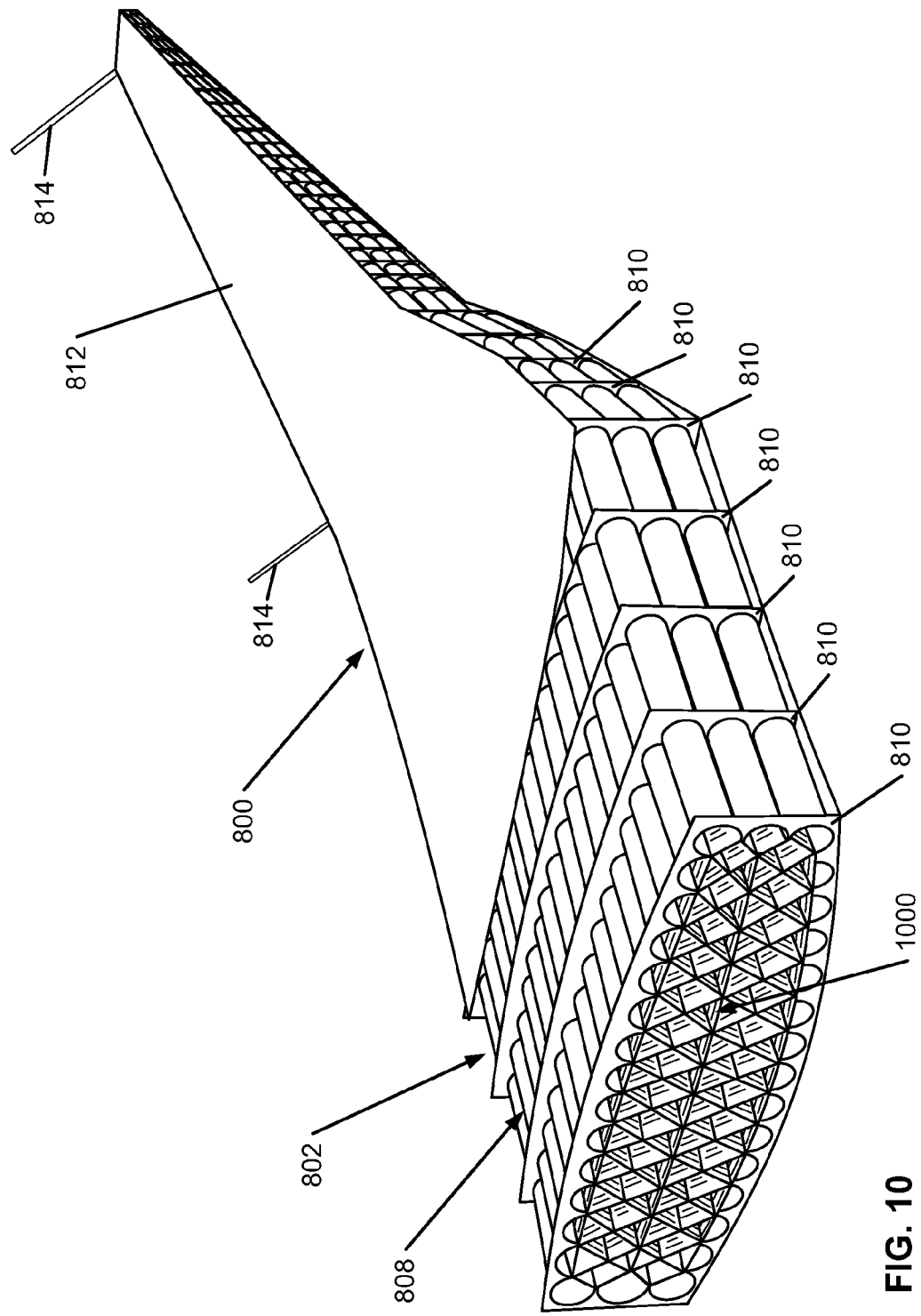
FIG. 10 is a perspective, cutaway view of the example fuel tank bundle of FIG. 8-9 including an example network of supports.

FIG. 10 illustrates the example fuel tank bundle 802 of FIG. 8 including a network of supports 1000. In the illustrated example, the network of supports 1000 extends into the example tanks 808 to provide rigidity and/or stiffness to the example fuel tank bundle 802.

Figure 11:
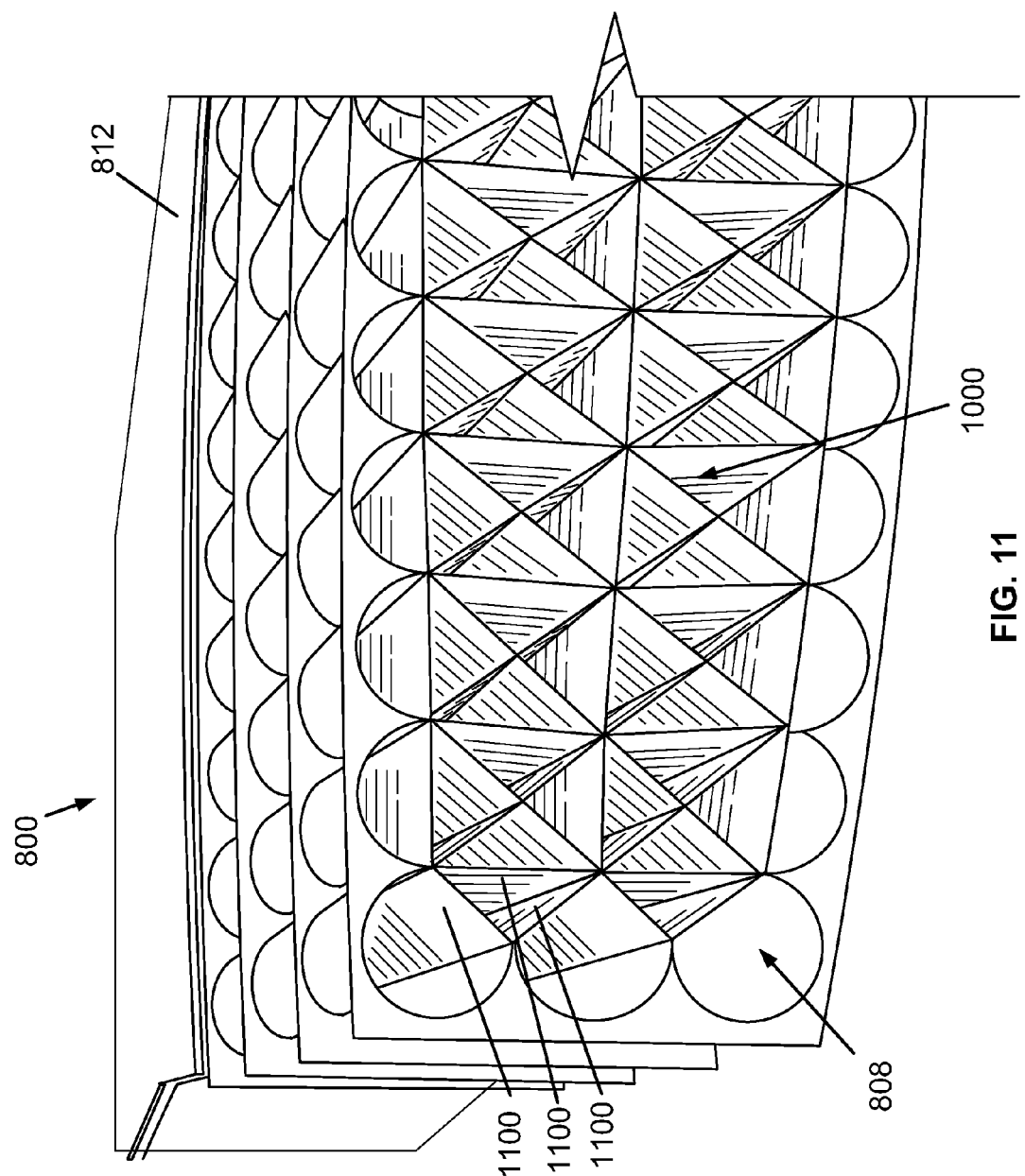
FIG. 11 illustrates the example network of supports of FIG. 10.

FIG. 11 is an enlarged view of the example network of supports 1000 of FIG. 10. In the illustrated example, the network of supports 1000 includes a plurality of plates 1100 disposed in a triangularly arranged pattern or lattice. For example, the plates 1100 may be disposed horizontally, vertically, and diagonally in the orientation of FIG. 11 to form a plurality of triangles when viewed from the perspective of FIG. 11. Thus, the example network of supports 1000 is semi-anisotropic (e.g., the network of supports 1000 may have different characteristics and/or properties along different axes). Other examples include supports disposed in different orientations and/or arrangements.

Figure 12:
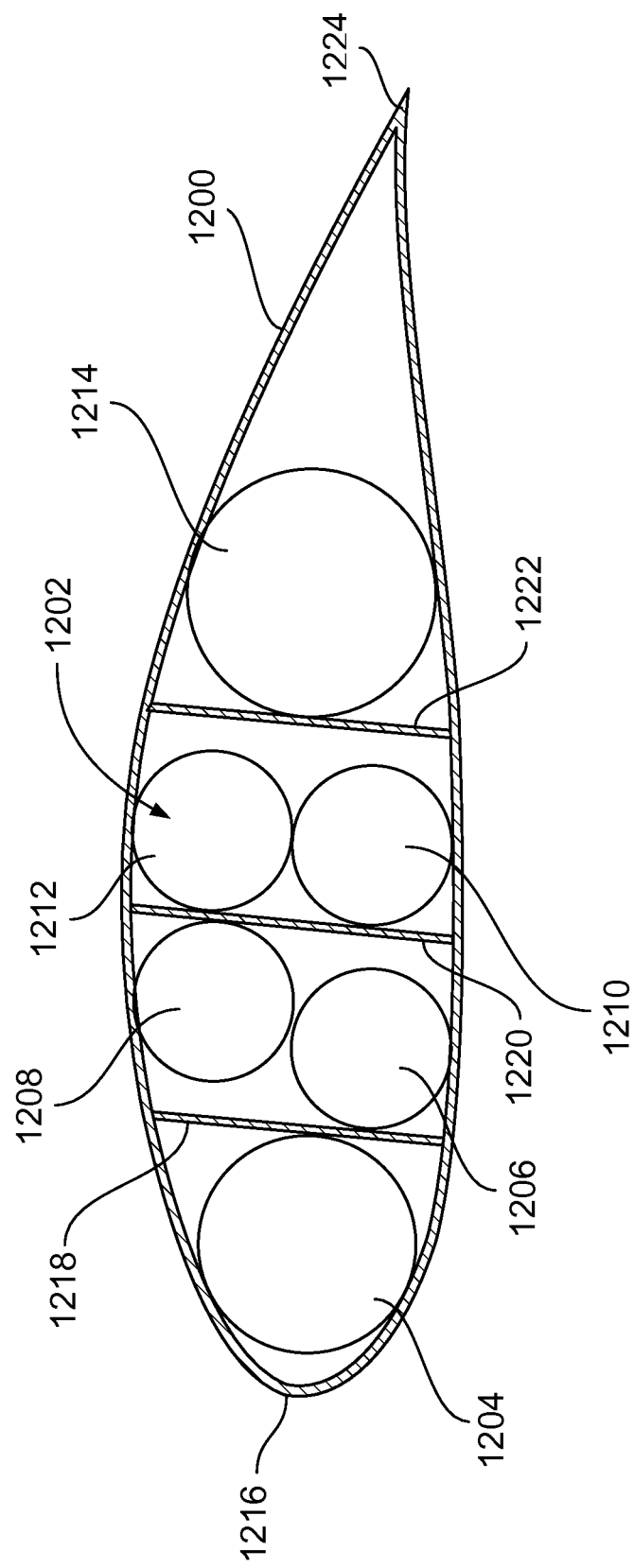
FIG. 12 is a cross-sectional view of an example airfoil-shaped structure including another example fuel tank bundle disclosed herein.

FIG. 12 is a cross-sectional view of an example airfoil-shaped structure 1200 and an example cryogenic fuel tank bundle 1202 disposed inside the example airfoil-shaped structure 1200. The airfoil-shaped structure 1200 of FIG. 12 may be, for example, the first wing 102, the second wing 104, the horizontal stabilizer 110, the vertical stabilizer 112, the canard wing 130, an engine pylon, the first wing support 126, the second wing support 128, the first engine support 120, the second engine support 122, and/or any other aircraft structure(s) of the example aircrafts 100, 118, 124 of FIGS. 1A-1C and/or any other airfoil-shaped structure of any other aircraft.

In the illustrated example, the cryogenic fuel tank bundle 1202 extends spanwise along the airfoil-shaped structure 1200. In the illustrated example, the cryogenic fuel tank bundle 1202 includes a first tank 1204, a second tank 1206, a third tank 1208, a fourth tank 1210, a fifth tank 1212 and a sixth tank 1214. In other examples, the cryogenic fuel tank bundle 1202 includes other numbers of tanks. In the illustrated example, the first tank 1204 is disposed between a leading edge 1216 of the airfoil-shaped structure 1200 and a first spar 1218. The example second tank 1206 and the example third tank 1208 are disposed between the first spar 1218 and a second spar 1220. The example fourth tank 1210 and the example fifth tank 1212 are disposed between the second spar 1220 and a third spar 1222. In the illustrated example, the fifth tank 1212 is disposed between the third spar 1222 and a trailing edge 1224 of the example airfoil-shaped structure 1200. In the illustrated example, the cryogenic fuel tank bundle 1202 is coupled to the example airfoil-shaped structure 1200 to substantially isolate the example first tank 1204, the example second tank 1206, the example third tank 1208, the example fourth tank 1210, the example fifth tank 1212 and/or the example sixth tank 1214 from structural and/or aerodynamic loads applied to the example airfoil-shaped structure 1200. Thus, structural and/or aerodynamic loads applied to the airfoil-shaped structure 1200 are substantially not transferred to the example first tank 1204, the example second tank 1206, the example third tank 1208, the fourth tank 1210, the example fifth tank 1212 and/or the example sixth tank 1214.

In the illustrated example, the tanks 1204, 1206, 1208, 1210, 1212, 1214 are dimensioned to enable the tanks 1204, 1206, 1208, 1210, 1212, 1214 to substantially fill spaces or volumes inside the airfoil-shaped structure 1200. For example, in the illustrated example, the first tank 1204 is has a first diameter, and the first diameter is substantially a maximum diameter that enables the first tank 1204 to be disposed between the leading edge 1216 and the first spar 1218. The example second tank 1206 and the example third tank 1208 each have a second diameter, and the second diameter is substantially a maximum diameter that enables both the second tank 1206 and the third tank 1208 to be disposed in the space between the first spar 1218 and the second spar 1220. In the illustrated example, the second diameter is less than the first diameter. The example fourth tank 1210 and the example fifth tank 1212 each have the second diameter to enable the fourth tank 1210 and the fifth tank 1212 to substantially fill a space or volume between the second spar 1220 and the third spar 1222. The example sixth tank 1214 has a third diameter. The example third diameter is greater than the first diameter and the second diameter, and the third diameter is substantially a maximum diameter that enables the sixth tank 1214 to be disposed in the space between the third spar 1222 and the trailing edge 1224. In other examples, the tanks 1204, 1206, 1208, 1210, 1212, 1214 have other sizes and/or arrangements.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
   an airfoil-shaped structure disposed outboard of a fuselage of an aircraft;
   a first cryogenic fuel tank disposed inside the airfoil-shaped structure; and
   a second cryogenic fuel tank disposed inside the airfoil-shaped structure, a surface of the second cryogenic fuel tank coupled to a surface of the first cryogenic fuel tank to form a wall extending between the first cryogenic fuel tank and the second cryogenic fuel tank along a longitudinal axis defined by the surface of the first cryogenic fuel tank and the surface of the second cryogenic fuel tank, the wall coupled to the airfoil-shaped structure to support a portion of at least one of an aerodynamic load or a structural load applied to the airfoil-shaped structure.

2. The apparatus of claim 1, wherein the airfoil-shaped structure is at least one of a wing, a horizontal stabilizer, a vertical stabilizer, an engine pylon, a wing strut, a canard or an empennage strut.

3. The apparatus of claim 1, wherein the first cryogenic fuel tank extends spanwise relative to the aircraft.

4. The apparatus of claim 1 further comprising a baffle disposed in the first cryogenic fuel tank to impede fuel flow in a spanwise direction.

5. The apparatus of claim 1, further including a support extending through the first cryogenic fuel tank.

6. The apparatus of claim 1, wherein the first cryogenic fuel tank is to support a first portion of the at least one of the aerodynamic load or the structural load applied to the airfoil-shaped structure.

7. The apparatus of claim 6, wherein the second cryogenic fuel tank is to support a second portion of the at least one of the aerodynamic load or the structural load.

8. The apparatus of claim 1, further comprising a rib coupled to the first cryogenic fuel tank and the airfoil-shaped structure.

9. The apparatus of claim 8, wherein a fuel passageway of the first cryogenic fuel tank extends through the rib.

10. An apparatus, comprising:
a housing of an aircraft, the housing disposed outboard of a fuselage of the aircraft;
a first cryogenic fuel tank disposed inside the housing; and
a second cryogenic fuel tank disposed inside the housing, a surface of the second cryogenic fuel tank coupled to a surface of the first cryogenic fuel tank to form a wall extending between the first cryogenic fuel tank and the second cryogenic fuel tank along a longitudinal axis defined by the surface of the first cryogenic fuel tank and the surface of the second cryogenic fuel tank, the wall coupled to the housing to support a portion of at least one of an aerodynamic load or a structural load applied to the housing.

11. The apparatus of claim 10, wherein a first portion of the first cryogenic fuel tank extends substantially parallel to a second portion of the second cryogenic fuel tank.

12. The apparatus of claim 10 further comprising a rib coupled to the first cryogenic fuel tank and the housing, wherein a first fuel passageway of the first cryogenic fuel tank extends through a first aperture defined by the rib.

13. The apparatus of claim 12, wherein a second fuel passageway of the second fuel tank extends through a second aperture defined by the rib.

14. The apparatus of claim 10, wherein the first cryogenic fuel tank includes a first section and a second section, the second section outboard of the first section.

15. The apparatus of claim 14, wherein the second section is a cap.

16. The apparatus of claim 14, wherein the first section is cylindrical and the second section is tapered.

17. The apparatus of claim 14, wherein the first section is in a first orientation relative to the fuselage and the second section is in a second orientation different than the first orientation relative to the fuselage.

18. An apparatus, comprising:
a housing of an aircraft, the housing disposed outboard of a fuselage of the aircraft; and
a cryogenic fuel tank bundle substantially filling a space inside the housing, the cryogenic fuel tank bundle including a first cryogenic fuel tank and a second cryogenic fuel tank, a surface of the second cryogenic fuel tank coupled to a surface of the first cryogenic fuel tank to form a wall extending between the first cryogenic fuel tank and the second cryogenic fuel tank along a longitudinal axis defined by the surface of the first cryogenic fuel tank and the surface of the second cryogenic fuel tank, the wall coupled to the housing to support a portion of at least one of an aerodynamic load or a structural load applied to the housing.

19. The apparatus of claim 18, wherein a chord of the housing at least one of increases or decreases along a portion of a span of the housing.

20. The apparatus of claim 18, wherein the cryogenic fuel tank bundle includes a network of supports arranged in a lattice along a longitudinal axis of the fuel tank bundle.

21. The apparatus of claim 18, wherein the cryogenic fuel tank is disposed in an array.

22. An apparatus, comprising:
an airfoil-shaped structure disposed outboard of a fuselage of an aircraft, the airfoil-shaped structure having a first surface coupled to the fuselage and a second surface coupled to the fuselage, the first surface spaced apart from the second surface;
a first cryogenic fuel tank disposed inside the airfoil-shaped structure; and
a second cryogenic fuel tank disposed inside the airfoil-shaped structure, the first surface and the second surface defining a first axis extending between the first surface and the second surface and passing through the first cryogenic fuel tank and the second cryogenic fuel tank, the first axis parallel to a second axis defined by the fuselage, the second axis extending through the fuselage perpendicular to at least a portion of the first surface and at least a portion of the second surface.

* * * * *